(12) United States Patent
Nusekabel et al.

(10) Patent No.: US 6,229,791 B1
(45) Date of Patent: May 8, 2001

(54) METHOD AND SYSTEM FOR PROVIDING PARTITIONING OF PARTIALLY SWITCHED NETWORKS

(75) Inventors: Mark R. Nusekabel, Tampa; Heidi Strayer, Plant City; Kenneth Jussi Christensen, Tampa, all of FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/110,933

(22) Filed: Jul. 6, 1998

(51) Int. Cl.[7] .............................. H04L 12/26; H04L 12/28
(52) U.S. Cl. .................... 370/252; 370/252; 370/400; 370/254
(58) Field of Search .................................. 370/252, 254, 370/255, 256, 351, 400, 408, 230, 235, 237, 229

(56) References Cited

U.S. PATENT DOCUMENTS 5,598,532 * 1/1997 Liron ............................... 395/200.01
6,026,095 * 2/2000 Sherer et al. ........................ 370/448
6,049,720 * 4/2000 Rude .................................... 455/503

* cited by examiner

Primary Examiner—Huy D. Vu
Assistant Examiner—Danny Nguyen
(74) Attorney, Agent, or Firm—JoAnn K. Crockatt; Anne Vachon Dougherty

(57) ABSTRACT

The invention provides that each of the components (i.e., switches, LAN segments, and workstations) is treated as a node for placement in a tree structure topology, with one switch at the top of the tree. Each switch may have other switches or LAN segments connected to it, with each LAN segment having a plurality of workstations attached to it. The workstations are the leaf nodes of the tree and cannot have anything connected to them. The inventive method for determining optimal partitioning is to calculate the mean switch delay, the mean segment delay, and the standard deviation as a function of the total number of workstations in the network, and to sum the values together. Finally, the invention applies a Tabu Search to the potential tree-structured solutions to the problem in order to rapidly and accurately determine the optimal network configuration.

10 Claims, 2 Drawing Sheets

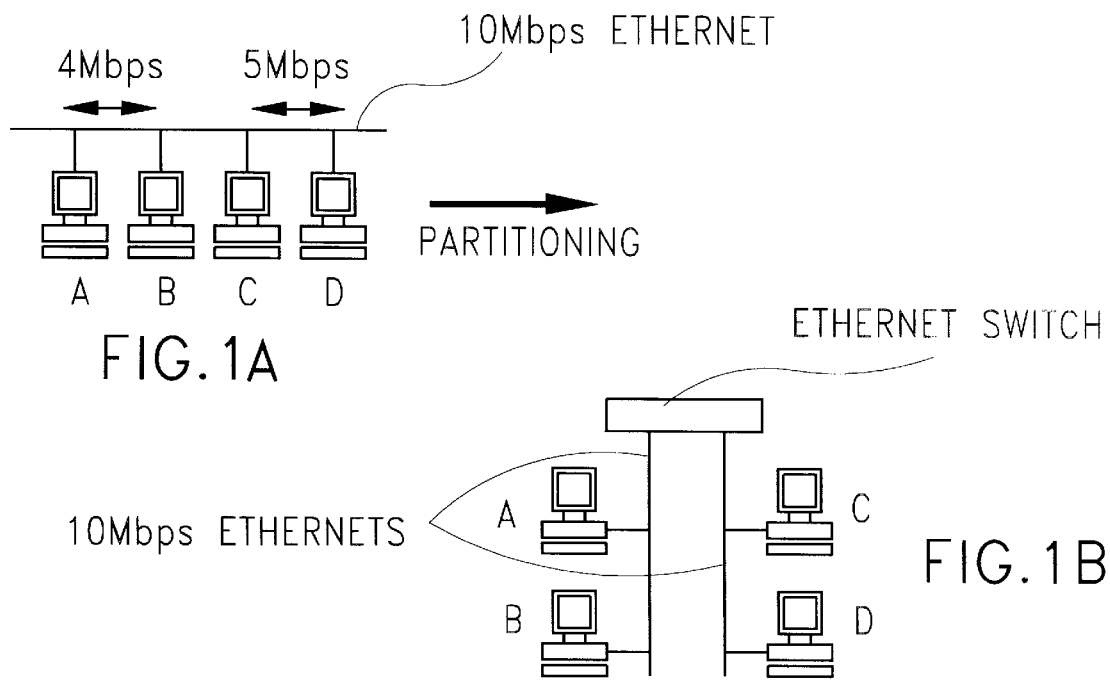
FIG.1A
FIG.1B
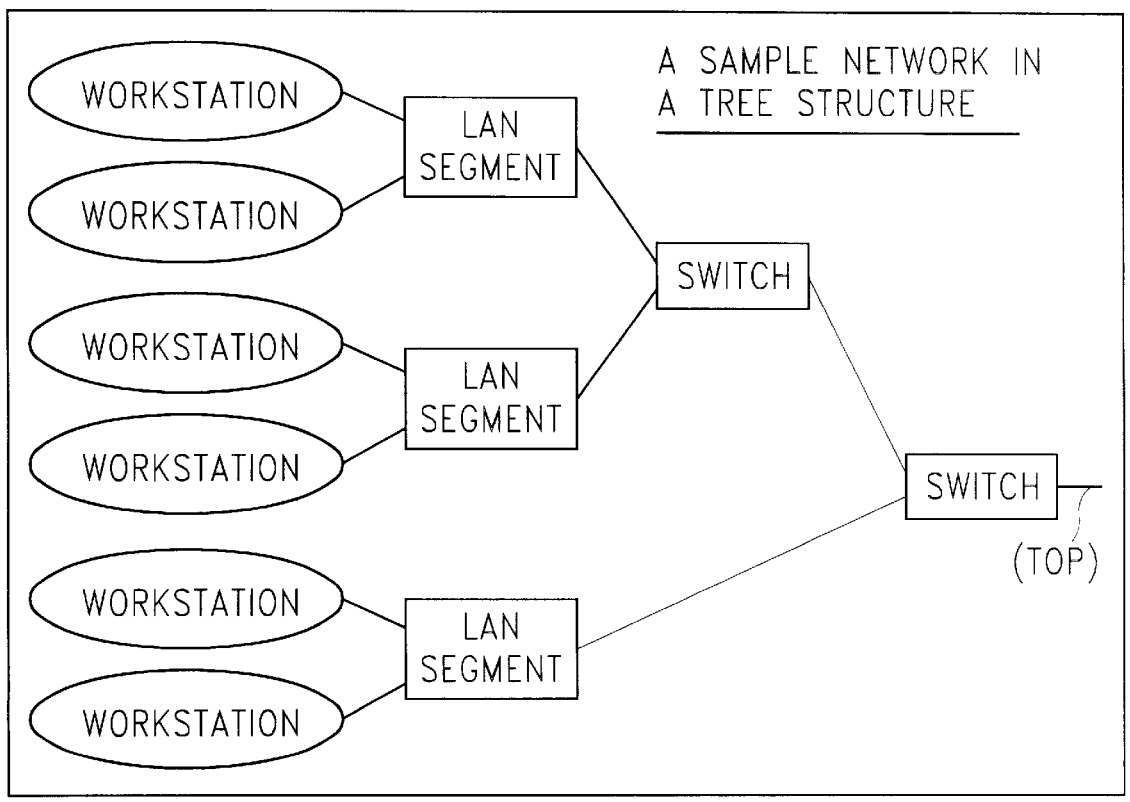
FIG.2

METHOD AND SYSTEM FOR PROVIDING PARTITIONING OF PARTIALLY SWITCHED NETWORKS

FIELD OF THE INVENTION

This invention relates to partitioning of a partially switched local area network (LAN) and more particularly to using a Tabu Search methodology to find optimal switch configurations.

BACKGROUND OF THE INVENTION

Local area networks (hereinafter "LANs"), as typified by Ethernet networks in accordance with IEEE Standard 802.3, share a fixed amount of bandwidth between multiple host workstations. When the demands of the hosts reach or exceed the capacity of the LAN, throughput decreases and packet delay increases. In order to improve performance, the LAN can be partitioned into a partially switched network using IEEE 802.1d compliant LAN switches. By utilizing such switches, the host workstations can be distributed among multiple switch-connected LAN segments of varying size, so as to minimize and balance the segments. However, determining how to partition, or segment, a LAN and estimating the performance improvements to be realized by a given partitioning scheme are challenging problems.

Different partitioning approaches have utilized various network characteristics in determining how to partition. For example, in the research paper entitled "Topological Design of Local-Area Networks Using Genetic Algorithms" by R. Elbaum and M. Sidi, *Proceedings of IEEE INFOCOM '95*, pp. 64–71 (1995), Genetic and Simulated Annealing algorithms are employed for solving network partitioning problems. The Elbaum approach segments the network into clusters using bridges and represents the traffic on the LAN segments and bridges to determine the total network delay based on the traffic in the different parts of the network. The Elbaum approach does not, however, allow for biasing or balancing of delay. Moreover, because it uses bridges to segment the network, it allows multiple bridges to attach to a segment, and only two segments to attach to a bridge.

Another approach, found in "Analyser, A Genetic Algorithm Based Network Divider" by C. Farrell, et al, http://www.cs.curtin.edu.au/~netman/analyser.html (1994), uses Simulated Annealing for separating the workstations in an existing network into two segments using a so-called "generic network connecting device." The approach concentrates on maximizing and balancing intra-segment traffic, but does not consider multiple segments or characteristics of the segments, such as capacity, nor does it consider characteristics of the partitioning device, such as switch delay.

Yet another approach, outlined by M. Songerwala in "Efficient Solutions to the Network Division Problem", http://www.cs.curtin.edu.au/~netman/analyser.html (1995), and which employs the Genetic algorithm, also fails to consider multiple segments, characteristics of the segment, such as capacity, and characteristics of the partitioning device, such as switch delay.

A more detailed discussion of the prior art, and of the algorithms used therein, can be found in the Master's Thesis of Mark R. Nusekabel, dated July 7, 1997, entitled "Switched Network Partitioning Using Tabu Search," *University of South Florida*, the teachings of which are herein incorporated by reference.

What is needed, therefore, and what is an objective of the present invention, is to provide a system and method for determining optimal partitioning in a partially-switched LAN, which function takes into consideration both inter-segment and intra- segment traffic and characteristics, including attempting to minimize as well as balance the mean delay for the LAN segments, switch characteristics, including switch delay, and the number of workstations per segment.

SUMMARY OF THE INVENTION

The present invention achieves the foregoing and other objectives by approaching the LAN as a tree structure for partitioning. Each of the components (i.e., switches, LAN segments, and workstations) is treated as a node for placement in a tree structure topology, with one switch at the top of the tree. Each switch may have other switches or LAN segments connected to it, with each LAN segment having a plurality of workstations attached to it. The workstations are the leaf nodes of the tree and cannot have anything connected to them. The inventive method for determining optimal partitioning is to calculate the mean switch delay, the mean segment delay, and the standard deviation as a function of the total number of workstations in the network, and to sum the values together. Finally, the invention applies a Tabu Search to the potential tree-structured solutions to the problem in order to rapidly and accurately determine the optimal network configuration.

BRIEF DESCRIPTION OF THE DRAWINGS

The invention will now be described in greater detail with specific reference to the appended Figures wherein:

FIGS. 1A and 1B illustrate a sample local area network prior to and after basic partitioning.

FIG. 2 provides an illustration of a sample network in a tree structure.

DESCRIPTION OF THE PREFERRED EMBODIMENT

Figure 3:
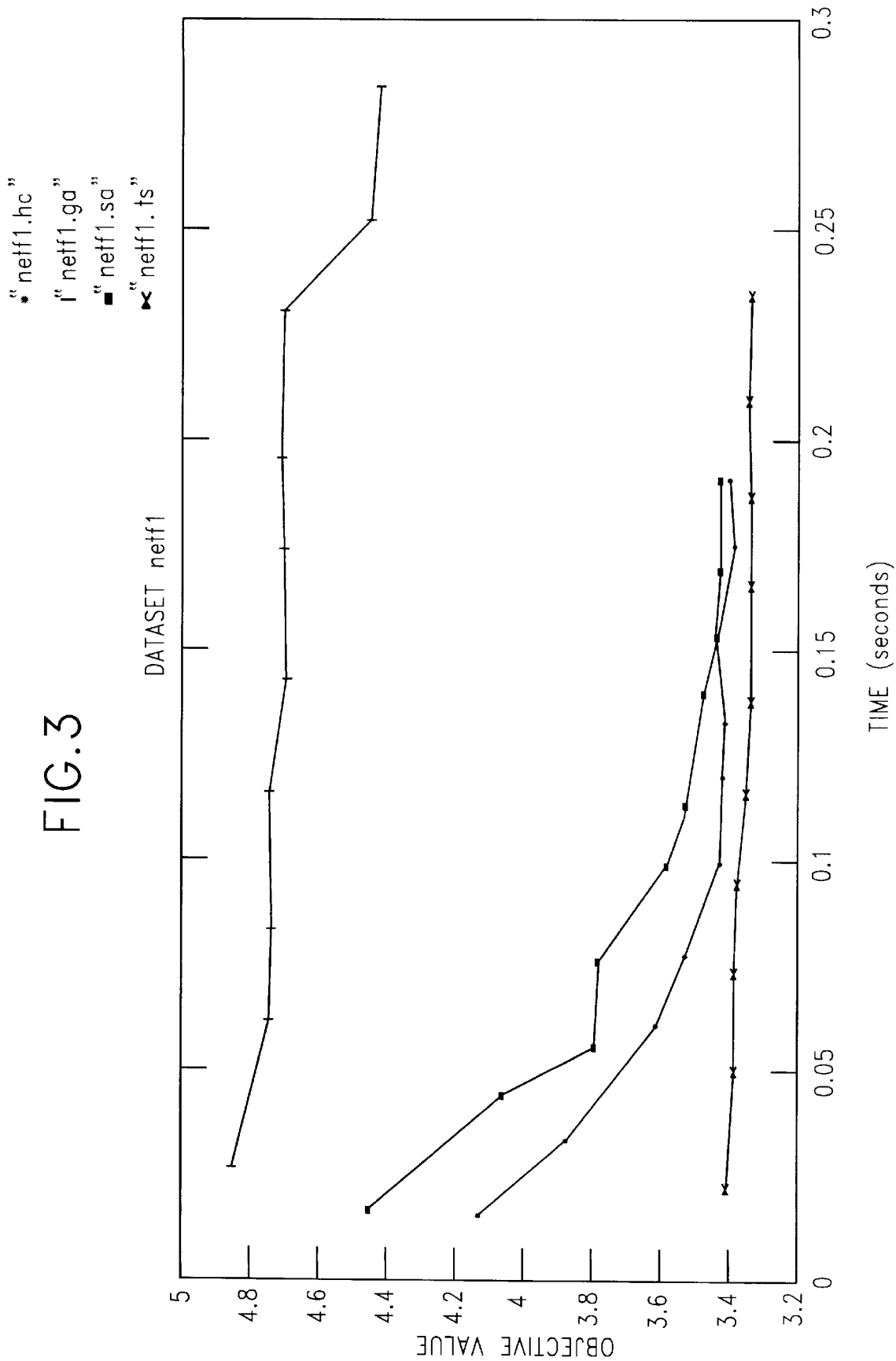
FIG. 3 provides a table comparing the partitioning achieved by applying different algorithms.

For purposes of the present description, a partially-switched LAN is understood to comprise at least one switch, at least two LAN segments and at least two workstations associated with each segment. A workstation will be generically interpreted as a computing device that communicates some amount of data with one or more other workstations on the network. A workstation can be any computing device, from a personal computer to a mainframe, or a network device, such as a printer, provided that it sends or receives traffic on the network. Each workstation will be connected as part of only one LAN segment, although clearly it can communicate with workstations in other segments through the switches. All switches are preferably chosen to be of the "cut-through" switch type, wherein the switch directly connects a segment on one port of the switch to a segment on another upon demand, without storing packets. With regard to the two limiting switch attributes, delay and bandwidth, it is assumed that the cut-through switches will exhibit a delay of about 40 microsecond per packet and that the bandwidth for the chosen switches will be adequate to handle volume equivalent to that of the LAN segments to which they are connected. Therefore, any bottlenecks which develop would be functions of bandwidth limitations of the LAN segment, as opposed to switch bandwidth limits. A LAN segment may connect to only one switch, but can then have any number of workstations connected to it. While Ethernet LAN segments will be referenced as one embodiment throughout, it is to be understood that the invention applies to generic LAN segments, as well. A first embodiment of the invention will address a function for partitioning generic LAN segments, while a second embodiment will more particularly detail the function for Ethernet LAN segments.

FIG. 1A provides a basic illustration of a LAN having four host workstations, wherein communications occur between workstations A and B at an average data rate of 4 Nbps, and between workstations C and D at an average data rate of 5 Mbps. Given a 9 Mbps data rate and the illustrated configuration, a 10 Nbps Ethernet is saturated and delays would render the system virtually unworkable. FIG. 1B provides an illustration of one solution to the LAN saturation problem, whereby the LAN is partitioned into two LAN segments connected through an Ethernet switch, with each segment comprising a 10 Mbps Ethernet. Given the fact that workstations A and B only communicate with each other, and that C and D only communicate with each other, the partitioning problem is relatively straightforward. Most LANs, however, have a greater number of workstations, which are in communication with a plurality of other workstations, necessitating communications across segments and requiring consideration of the aforementioned variety of balancing features for optimal partitioning.

In the FIG. 2 partially-switched network tree configuration, each component in the network serves as a node in the tree structure topology, connected together by edges. The following rules are applied for partitioning the network: a workstation, as a leaf on the tree is connected to exactly one LAN segment; the LAN segment, always an intermediate node on the tree, is connected to any number of workstations below it on the tree and to only one switch above it on the tree; and a switch, as either the top of the tree or as an intermediate node on the tree, may be connected to any number of LAN segments or switches beneath it, and to one switch or no switches above it. Given the set of components, any configuration that adheres to the foregoing rules is a potential solution to the partitioning problem. The challenge, as noted above, is to find a partitioning solution that yields a near-minimal average network traffic delay.

For approximating the average network delay, the traffic between pairs of workstations is tracked, and each specific quantity of traffic is added to the cumulative amount of traffic through each affected component. With the information totaled for all workstation traffic, the network delay that each component contributes can be calculated from the amount of traffic that it handles. For different types of components, the delay will be calculated in different ways, taking into consideration the different properties of each type of included component (i.e., switches, segments, etc.). For example, the number of packets through each switch must be multiplied by the delay, in seconds per packet, for that particular switch. Similarly, for a generic LAN segment, the bandwidth capacity is required to calculate the segment's network delay using the M/M/i queuing method. The LAN segment delay, as represented by an M/M/1 queue resolves to the formula:

$$\text{delay} = \frac{L}{C - L}$$

where L (for load) is the amount of intra-segment traffic on the LAN segment in megabits per second, and C (for capacity) is the amount of traffic that the segment can handle, also in megabits per second. For an Ethernet LAN segment, the network delay can be computed using the formula set forth in "A Carrier Sense Nultiple Access Protocol for Local Area Networks" by S. Lam, *Computer Networks*, vol. 4, pp. 21–32 (1980), which formula additionally requires a propagation/transfer time ratio shown below. Once one has the information related to the traffic volume and the component properties, an approximation for the average network delay can be calculated.

The inventive method for determining optimal partitioning is to calculate the mean switch delay, the mean segment delay, and the standard deviation as a function of the total number of workstations in the network, and to sum the values together. In formulaic terms, the inventive method is represented as:

$$f = \mu_S + \mu_G \sigma_W$$

where the θ relates to the mean network delay, $\mu_S$ correlates to the mean switch delay, $\mu_G$ corresponds to the mean segment delay, and $\sigma_W$ is the standard deviation as a function of the total number of workstations in the network. When the terms are expanded, the objective function for networks with generic LAN segments becomes the following:

$$f = \frac{\sum \left(\frac{L_s D_s}{P}\right)}{|S|} + \frac{\sum \left(\frac{L_g}{C_g - B \cdot L_g}\right)}{|G|} + \frac{1}{K} \sqrt{\frac{\sum \left[(W_g / C_g) - \left(\frac{\sum (W_g / C_g)}{|G|}\right)\right]^2}{|G|}}$$

where $L_s$ is the traffic load on a switch s in Mbs, $D^s$ is the mean delay for switch s in seconds per packet, P is the packet size in bits per packet, |S| is the number of switches, $L_g$ is the traffic load on segment g in Mbs, $C_g$ is the bandwidth capacity of segment g in Mbs, B is the balancing factor, |G| is the number of segments, W. is the number of workstations on segment g, and K is a constant, in seconds per megabit, set to make the third term less significant than the first two terms. The constant is recalculated for each potential configuration.

The function for a network having Ethernet segments is:

$$f = \frac{\sum \left(\frac{L_s D_s}{P}\right)}{|S|} + \frac{\sum \left(\frac{Td_g}{Tf_g}\right)}{|G|} + \frac{1}{K} \sqrt{\frac{\sum \left[(W_g / C_g) - \left(\frac{\sum (W_g / C_g)}{|G|}\right)\right]^2}{|G|}}$$

where $Tf_g$ is the relative transmission time in seconds per frame for segment g and $Td_g$ is the segment delay in second per frame, based on Lam's formula:

$$Td = Tf + t(4e + 1)/2 + \frac{r\{Tf^2 + t \cdot Tf(4e + 2) + t^2[5 + 4e(2e - 1)]\}}{2\{1 - r[Tf + t(2e + 1)]\}} - \frac{(1 - e^{-2rt})(e + r \cdot t - 3r \cdot t \cdot e)}{r \cdot e[(1/(1 + r \cdot Tf))e^{-(1+rt)} + e^{-2rt} - 1]}$$

The objective function assumes that the network is arranged in a tree structure. Based on this, a number of values need to be calculated. For each communication rate between two workstations, the path is traced between them. The total traffic value for every switch and LAN segment along the path is them incremented by the amount of their communication rate. By doing this for every communication between workstations, the total amount of traffic load going through each switch s ($L_s$ in Mbs) and the total amount of traffic going through each LAN segment g ($L_s$ in Mbs) is determined. Thus, the formula:

$$L_s \Sigma R_z, L_g = \Sigma R_z$$

for all communication rates R. going through switch s and segment g. The total number of workstations, $W_g$ for each segment g, is also counted.

As stated above, the inventive method comprises ascertaining values for the mean delay for the switches, the mean delay for the LAN segments, and the standard deviation as a function of the number of workstations per segment, and then summing those values. The first value to be calculated is the amount of delay due to traffic passing through the switches. The second term quantifies the amount of network delay caused by the traffic within the LAN segments. The third term accounts for the number of workstations on each segment when the sum of the delay caused by the switches and segments for two solutions is equal. A higher number of workstations causes slightly more delay due to overhead and additional possible sources of contention for the resource of the LAN segment.

The first of the three terms, representing the mean delay for the switches, is $$\mu_S = \frac{\sum \left( \frac{L_s D_s}{P} \right)}{|S|}$$

where $L_s$ is the traffic through switch s in megabits per second, $D_s$ is the delay per packet through switch s in seconds, P is the number of bits per packet, and |S| is the number of switches. This is the standard function for the mean of all traffic through the switches multiplied by their delay per packet.

The second term, correlating to the mean delay for the LANp2122Xt segments, is defined by one of two functions. For a generic LAN segment, the mean delay is arrived at by calculating:

$$\mu_G = \frac{\sum \left( \frac{L_g}{C_g - B \cdot L_g} \right)}{|G|}$$

where $L_g$ is the traffic on segment g is megabits per second, $C_g$ is the bandwidth for segment g in megabits per second, B is the balancing factor, and |G| is the number of segments. Because the foregoing formula increases exponentially as the segment's traffic increases, it is very effective in both minimizing the overall traffic and in balancing traffic among LAN segments. By default, as the bandwidth being used approaches the available bandwidth, the traffic is forced to be more balanced to make use of any free bandwidth. Similarly, when the bandwidth usage is very low compared to the available bandwidth, the formula sacrifices balancing to promote less overall network traffic by decreasing the amount of inter-segment traffic. Such is important since, when the traffic in the segments is low, less delay is experienced and less inter-segment traffic means less traffic carried over multiple segments and through switches. The balancing factor, a number between zero and $C_g/L_g$ allows the user to affect how much influence balancing has on the objective function. The same balancing factor is used for evaluation of all potential configurations for a given network, and reflects the user-selected relative importance of fairness (i.e., all users having a similar response time) and performance (i.e., a highest potential average response time).

For a LAN segment which is an Ethernet segment, the user must provide an extra parameter ak of the segment, which parameter indicates the segment's ratio of propagation delay time:transmission delay time. With t=1, $S_g = L_g/C_g$, $Tf_y = t/a_g$ and $r_g = S_g/Tf_g$, where $L_g$ is the traffic and $C_g$ is the bandwidth for segment g, then $Td_g$ equals the segment delay for g, based on Lam's formula. Finally, to determine the average delay, the following is used:

$$\mu_G = \frac{\sum (Td_g / Tf_g)}{|G|}$$

because $Td_g/Tf_g$ normalizes the delay, $Td_g$, based on the relative transmission time, $Tf_g$. When either of these formulas is divided by the total offered traffic, this yields the actual mean delay for the segments, in seconds per megabit. However, since the total offered traffic is constant, such a step is unnecessary.

The third value, the standard deviation as a function of the number of workstations per segment is arrived at by applying:

$$\sigma_w = \frac{1}{K} \sqrt{\frac{\sum \left[ (W_g/C_g) - \left( \frac{\sum (W_g/C_g)}{|G|} \right) \right]^2}{|G|}}$$

where $W_g$ is the number of workstations on segment g, $C_g$ is the bandwidth capacity of segment g in Mbs, |G| is the number of segments, and K is a constant in seconds per megabit. The formula is the standard deviation of the function $$h = \frac{W_g}{K \cdot C_g}$$

where all terms are defined as above, and the constant K is pulled outside the function for the standard deviation, because: StdDev(kx)=(k)StdDev(x). The purpose of K is to make this term less significant than the sum of the first two terms. The value of K must be set so that $0<(W_g/K)<L_g$. It is also assumed that $L_g<C_g$ and, then, with S( ) and M( ) as the standard deviation and mean functions, it can be asserted that:

$$\frac{1}{K} \sqrt{\frac{\sum \left[ (W_g/C_g) - \left( \frac{\sum (W_g/C_g)}{|G|} \right) \right]^2}{|G|}} =$$

$$S\left(\frac{W_g}{K \cdot C_g}\right) < M\left(\frac{W_g}{K \cdot C_g}\right) = \frac{\sum \left(\frac{W_g}{K \cdot C_g}\right)}{|G|} < \frac{\sum \left(\frac{L_g}{C_g}\right)}{|G|} < \frac{\sum \left(\frac{L_g}{C_g - L_g}\right)}{|G|}$$

Thus, the third term will always be less than the second term, and less significant than the sum of the first two terms. A value of =10 has been found to suffice.

The Tabu Search methodology is applied to optimize the invention. Key to the Tabu Search is its tabu list which maintains a list of moves (or, options) which are not allowed. For illustrative purposes, the tabu list may be implemented using an attributive, short-term, recency-based memory, with the size of the tabu list being set to the total number of network components divided by ten. Therefore, is a network has one switch, six segments and 53 workstations, then it would have a tabu list of (1+6+53)/10, or 6, moves. Tabu Search then allows for intensification options to encourage the convergence of many solutions to their local optima. For intensification, an elite solution strategy is used, which stores any solutions which have been determined to the best so far, and returns to them as needed. Diversification is a concept in Tabu Search which encourages divergence, once a local optimum is found, to attempt to find a more global optimum. For the diversification part of the search, the evaluations place workstations on segments where they have been the least, based on a frequency table which maintains a count of how often each of the workstations has been evaluated as part of each segment.

For its basic search algorithm, the Tabu Search alternates between a clustering-type algorithm and random moves. The clustering algorithm aggressively searches for better solutions. During an iteration, the algorithm considers every possible move and the net impact of making that move. It takes the gain of moving a workstation to a new segment and subtracts from that the cost of moving the workstation out of its current segment in terms of the impact of the move on delay for each segment. After each possible move of transferring each workstation to any segment is considered, the best move is selected. There are two parameters associated with alternating between this algorithm and the random moves. The clustering percent indicates what percentage of the time the algorithm should execute clustering versus making a random move. The clustering cycle controls the size of the bursts of clustering and random moves. To do this, the clustering cycle indicates the length of a full cycle of alternating between clustering and making random moves. For a sample implementation, the clustering percent is kept at 50, which has been experimentally determined to be a workable value. The clustering cycle defaults to the total number of network components. Thus, for a clustering percent of 50 and the network mentioned above, with 60 network components, the algorithm would alternate between 30 iterations of clustering and 30 iterations of random moves.

Pseudo-code for a Tabu Search clustering routine, as part of the present invention is shown below:

```
Clustering:
if (the remainder of iteration/clustering_cycle)
    <(clustering_percent*clustering_cycle) then cluster:
if iteration is within the clustering part of the cycle, then do:
    evaluate all moves for each workstation based on the
        improvement in segment delay between that workstation and
        the others that it communicate with
    if a beneficial move is found then make it
    else continue with random = "yes"
else continue with random = "yes"
```

The intensification technique implemented involves maintenance of a set of elite solutions. Every time the algorithm creates a solution which is the best so far, it adds that solution to the elite set. The algorithm keeps a counter of how many iterations have passed without any improvements. When this counter reaches a certain limit (i.e., the intensification point), then the best elite solution is extracted and deleted from the set, and the search continues from that elite solution.

For the diversification aspects of the Tabu Search application, a table of counters is maintained with a size equal to the number of workstations times the number of segments, for all possible workstations and their locations in frequency-based memory. Every time a move is made, the location of each workstation is indicated in the table. The counter of iterations without improvements, which was used in intensification, is used in diversification, but with a higher limit (i.e., the diversification point). When intensification efforts are not successful, such that the intensification point is reached a certain number of times, then the algorithm tries a diversification move. For illustrative purposes, a diversification point calculated as the number of network components divided by four has been found to produce good results. Thus, for the network of 60 components, the diversification point would be at 15 sequential moves that do not show improvement. When invoked, the diversification routine searches its table for which workstation has been in which LAN segment the least, and then moves that workstation to that segment for successive iterations. The pseudo-code for diversification follows:

```
Diversification:
    generate a new solution based on solution1 and moving the
        workstation that is least frequently in a particular
        segment to that segment.
```

Together, these pieces of a Tabu Search algorithm make up a very powerful and complete strategy. The clustering causes the algorithm to aggressively search for better solution quickly. The random element helps keep the algorithm from locking in on a local optimum too fast. The intensification effectively allows the algorithm to back up to a previous good solution and take a different direction when the current direction reaches a local optimum. Lastly, when all of the elite solutions have reached their local optimum, the diversification routine forces the algorithm to investigate types of solutions that have not yet been tested. Furthermore, the amount of work done at each iteration is at most an order of the number of workstations times the number of segments. The pseudo-code for the Tabu Search technique follows:

```
if new solution is better than the one before then set change_count=0
else increment change_count=change_count+1
if change_count>diversification_point then diversifying="yes"
else if change_count>intensification_point then intensifying="yes"
else if iteration_number in the clustering_cycle then   clustering="yes"
else random="yes"
if intensifying then do:
    solution1=Random(elite solution set)
    set intensifying to "no"
else solution1=newest solution
trying="yes"
while trying do
    if diversifying then call Diversification Routine
    if clustering then call Clustering Routine
    if random then generate and make a random move
    evaluation the solution generated by the move
        if the new solution is best do far save and accept move
            add the solution to the elite solutions list
            set trying="no"
        else if new solution not in tabu list then accept move
            set trying="no"
end while
actually generate the new solution based ont he accepted move
update the tabu list with the accepted move
update the frequency table with the resulting solution.
```

FIG. 3 provides a graph illustrating the performance of the inventive method with Tabu Search as compared to the performance of prior art algorithms for a given data set. The data set was comprised of 100 host workstations for which 200 communication rates were known for communications among the 100 workstations. For the particular example, it was specified that the partitioning result in each workstation being assigned to only one of two segments. The limitation of only two segments assured a reasonable comparison to those prior art algorithms which are incapable of partitioning the network into anything greater than two segments. As can be seen from the results plotted for each partitioning solution, the Tabu search provided superior results, even when restricted to a two segment solution. The Tabu search solution has, on average, objective values which are roughly seven percent (7%) greater than the Genetic or Simulated Annealing algorithms. It is to be noted that there may be instances for which the Tabu Search will coincidentally arrive at the same partitioning solution as arrived at by one or more prior art algorithms. Nonetheless, the inventive system and method utilizes more comprehensive analysis of a greater variety of contributing network factors to arrive at its solutions.

The invention has been described with reference to several specific embodiments. One having skill in the relevant art will recognize that modifications may be made without departing from the spirit and scope of the invention as set forth in the appended claims.

Having thus described our invention, what we claim as new and desire to secure by letters patent is:

1. A method for partitioning of workstations of a local area network into segments for a partially-switched network comprising the steps of:
    (a) selecting a first partitioning arrangement comprising a plurality of segments connected by at least one switch, each of said plurality of segments having at least one workstation;
    (b) calculating the mean delay for said at least one switch for said first partitioning arrangement;
    (c) ascertaining the mean delay for each of said plurality of segments;
    (d) determining the standard deviation as a function of the number of workstations for said selected partitioning arrangement; and
    (e) summing said mean switch delay, said mean segment delay and said standard deviation.
2. The method of claim 1 further comprising the steps of:
    selecting a successive partitioning arrangement;
    repeating steps (b) through (e) for said successive partitioning arrangement;
    comparing the results for said first and said successive partitioning arrangements; and
    identifying the preferred partitioning arrangement based upon said comparing.
3. The method of claim 2 further comprising the steps of iteratively repeating said selecting, repeating, comparing and identifying for a plurality of successive partitioning arrangements until an optimum arrangement is identified.
4. The method of claim 3 further comprising applying a metaheuristic search methodology to said iteratively repeating.

5. The method of claim 4 wherein said applying of a metaheuristic search methodology comprises utilizing a Tabu Search.
6. The method of claim 5 wherein said identifying further comprises the step of determining if a partitioning arrangement is unworkable and wherein said Tabu Search comprises the step of:
    maintaining a list of unworkable selected partitioning arrangements.
7. The method of claim 6 wherein said Tabu Search further comprises the steps of:
    maintaining a list of preferred partitioning arrangements based upon said comparing;
    iteratively repeating based upon one of said preferred partitioning arrangements;
    keeping a count of iterative repetitions without adding to said list;
    comparing said count of iterative repetitions to a threshold; and
    when said count reaches said threshold, selecting a successive one of said preferred partitioning arrangements and iteratively repeating based upon said successive one of said preferred partitioning arrangements.
8. The method of claim 7 wherein said selecting further comprises the steps of:
    keeping a plurality of counters, one for each workstation evaluated at each segment;
    identifying a workstation which has been evaluated least at a given segment; and
    evaluating said workstation at said given segment.
9. A system for determining optimal partitioning of workstations of a local area network into segments for a partially-switched network comprising:
    (a) a selector for selecting at least one partitioning arrangement comprising a plurality of segments connected by at least one switch, each of said plurality of segments having at least one workstation; and
    (b) an evaluator for evaluating the delay in said selected partitioning arrangement comprising a calculating component for calculating the mean delay for said at least one switch for said first partitioning arrangement; a delay component for ascertaining the mean delay for each of said plurality of segments; a determining component for determining the standard deviation as a function of the number of workstations for said selected partitioning arrangement; and summing means for summing said mean switch delay, said mean segment delay and said standard deviation.
10. The system of claim 9 further comprising:
    a comparator for comparing the delay of first and successive selected partitioning arrangements; and
    a partitioning component for identifying a preferred partitioning arrangement based upon said comparing.

* * * * *